(12) United States Patent
Piwowarski

(10) Patent No.: US 6,405,130 B1
(45) Date of Patent: Jun. 11, 2002

(54) NAVIGATION SYSTEM USING FORWARD-LOOKING ORIGIN SELECTION FOR ROUTE RE-CALCULATION

(75) Inventor: Jim J. Piwowarski, Holly, MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 0 days.

(21) Appl. No.: 08/762,012

(22) Filed: Dec. 11, 1996

(51) Int. Cl.[7] .............................................. G06F 19/00
(52) U.S. Cl. ...................... 701/210; 701/208; 701/209; 340/990; 340/995
(58) Field of Search ................................ 701/208, 209, 701/210, 23, 25, 26, 200, 201, 202; 340/988, 990, 995; 73/178 R

(56) References Cited

U.S. PATENT DOCUMENTS

| | | | | |
|---|---|---|---|---|
| 5,031,104 A | * | 7/1991 | Ikeda et al. ................. | 364/449 |
| 5,262,775 A | | 11/1993 | Tamai et al. | |
| 5,291,413 A | * | 3/1994 | Tamai et al. ................ | 364/449 |
| 5,291,414 A | * | 3/1994 | Tamai et al. ................ | 364/449 |
| 5,371,678 A | * | 12/1994 | Nomura ...................... | 364/444 |
| 5,406,490 A | * | 4/1995 | Braegas ...................... | 364/449 |
| 5,428,545 A | * | 6/1995 | Maegawa et al. ............ | 364/444 |
| 5,465,088 A | | 11/1995 | Braegas | |
| 5,504,482 A | * | 4/1996 | Schreder ..................... | 340/995 |
| 5,508,930 A | * | 4/1996 | Smith, Jr. ................... | 364/444 |
| 5,557,522 A | * | 9/1996 | Nakayama et al. ..... | 364/424.02 |
| 5,559,511 A | * | 9/1996 | Ito et al. ..................... | 340/995 |
| 5,568,390 A | * | 10/1996 | Hirota et al. ............... | 364/449 |
| 5,638,280 A | * | 6/1997 | Nishimura et al. ......... | 364/449 |
| 5,652,706 A | * | 7/1997 | Morimoto et al. ....... | 364/449.4 |
| 5,712,632 A | * | 1/1998 | Nishimura et al. ......... | 340/995 |
| 5,983,158 A | * | 11/1999 | Suzuki et al. ............... | 701/209 |

OTHER PUBLICATIONS

John Guzolek et al., "Real–Time Route Planning in Road Networks", 1989, pp. 165–169.

* cited by examiner

Primary Examiner—William A. Cuchlinski, Jr.
Assistant Examiner—Arthur D. Donnelly
(74) Attorney, Agent, or Firm—Carlson, Gaskey & Olds, P.C.

(57) ABSTRACT

A navigation system calculates a first route to a first destination. If the navigation system determines while en route that a second route would result in a significant time saving, the navigation system selects a point along the first route between the current vehicle location and the first destination as a new "origin" for the second route. The navigation system guides the user to the intermediate point along the first route. The navigation system then guides the user from the intermediate point along the second route. The second route can be an alternate route to the same destination or an alternate route to a second destination.

21 Claims, 2 Drawing Sheets

NAVIGATION SYSTEM USING FORWARD-LOOKING ORIGIN SELECTION FOR ROUTE RE-CALCULATION

BACKGROUND OF THE INVENTION

The present invention relates generally to navigation systems and more specifically to an improved navigation system for calculating an alternate route.

Navigation systems generally provide a recommended route from an origin to a desired destination. Generally, the origin and desired destination are selected from a large database of roads stored in a mass media storage device, such as a CD ROM, which includes the roads in the area to be traveled by the user. The navigation system typically includes one or more position determining devices, such as a GPS (Global Positioning System) receiver, which indicates the current position of the vehicle relative to the database. The navigation system typically defines the current vehicle location as the origin for calculating a route. The navigation system then determines a route from the origin to the desired destination utilizing algorithms well-known to those in the art and currently in use in many navigation systems. The navigation system selects a recommended route from the origin to the desired destination based upon "cost" values associated with each segment of road in the road database, such as the estimated time of travel through the road segment. The navigation system determines the route with the lowest total estimated time of travel to the desired destination. The recommended route is then displayed to the user as a map showing the origin and desired destination and highlighting the recommended route. The navigation system then displays the current position of the vehicle and turn-by-turn instructions to the driver, guiding the driver to the desired destination.

If the navigation system also includes a receiver for receiving information relating to traffic congestion of certain road segments, the navigation system recalculates the estimated times of travel for the road segments and may determine that an alternate route would be preferable. Similarly, while en route to a first desired destination, a driver may decide instead to travel to a second destination. In either situation, because the known navigation systems utilize the current vehicle location as the origin, the vehicle is no longer at the origin by the time the route is calculated and then displayed to the driver. As a result, the driver may have already missed an initial maneuver or may be tempted to attempt a rushed maneuver. This causes not only obvious safety concerns but also causes anxiety and discomfort to the driver utilizing the navigation system.

SUMMARY OF THE INVENTION

The present invention provides a navigation system which selects a point on the first recommended route as an "origin" for the second recommended route. The navigation system includes a CPU, a database of roads to be travelled by the user, position-determining devices, and a user input device.

The navigation system calculates a first route according to known algorithms to a first selected destination. As the navigation system guides the driver turn-by-turn toward the first destination along the first recommended route, there are situations where the navigation system of the present invention calculates a second recommended route. In such situations, the point selected as the "origin" for the second recommended route is an intermediate point lying on the first route between the current vehicle location and the first destination. Depending upon whether the vehicle is travelling a highway or sidestreet, the actual or expected speed of the vehicle, and what type of initial maneuver is required, the intermediate point is selected to give the driver the necessary lead time to make the initial maneuver onto the second recommended route.

One situation where a second recommended route is calculated by the navigation system is where the second recommended route is an alternate route to the first destination which avoids a congested road segment. Another situation is where the second route also leads to a second destination rather than the first destination, such as when the driver decides to travel to the second destination while en route to the first destination.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF A PREFERRED EMBODIMENT

Figure 1:
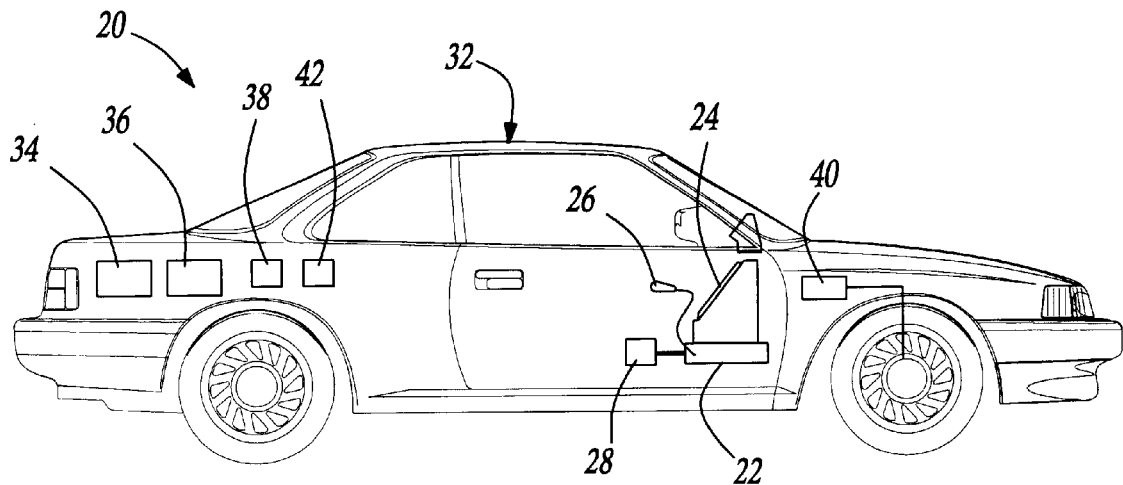
FIG. 1 is a schematic of the navigation system of the present invention installed in a vehicle.

The navigation system 20 of the present invention is shown schematically in FIG. 1. The navigation system 20 includes a CPU 22 connected to a display 24, such as a high resolution LCD or flat panel display. The CPU is also connected to a input device 26 such as a mouse, keyboard, keypad or remote device. Alternatively, the display 24 can be a touch screen display. The navigation system 20 further includes a database 28 connected to the CPU 22. The database 28 is a mass media storage device, such as a CD ROM, which includes a map of all of the roads in the area to be traveled by the user. Each road in the database is divided into road segments, each having an associated set of cost values, which indicate the "cost" of traveling that road segment. For example, the cost values include the estimated time of travel on the road segment and current traffic congestion level.

Figure 2:
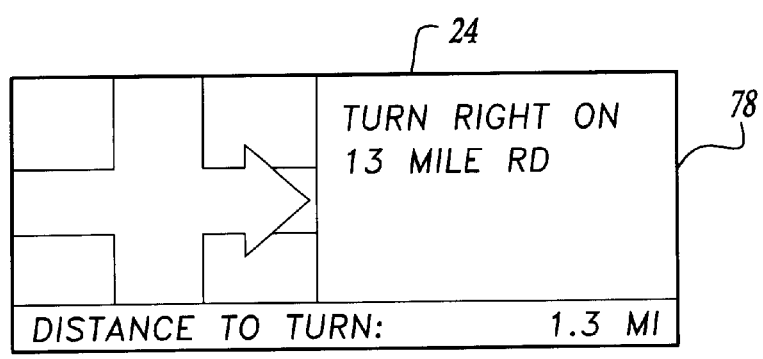
FIG. 2 is a screen of the display of the navigation system of FIG. 1.

The navigation system 20 is preferably installed in a vehicle 32. The navigation system 20 preferably includes position determining devices, such as a GPS system 34, a gyroscope 36, a compass 38, and a wheel speed sensor 40, all connected to the CPU 22 [connections not shown for simplicity]. Such position determining devices are well known and are commercially available. The navigation system further includes a congestion data receiver 42, such as a radio receiver, for receiving up-to-date broadcast information regarding traffic congestion levels of area road segments. Congestion monitoring devices are known and are currently used to automatically monitor the congestion levels of certain road segments. Preferably, information gathered from the congestion monitoring devices is broadcast to the surrounding area and received by the congestion data receiver 42. The data receiver 42 sends the congestion information to the CPU 22, which stores the updated congestion information. As shown in FIG. 2, the navigation system 20 guides the driver to a selected destination with turn-by-turn instructions shown on the display 24.

Figure 3:
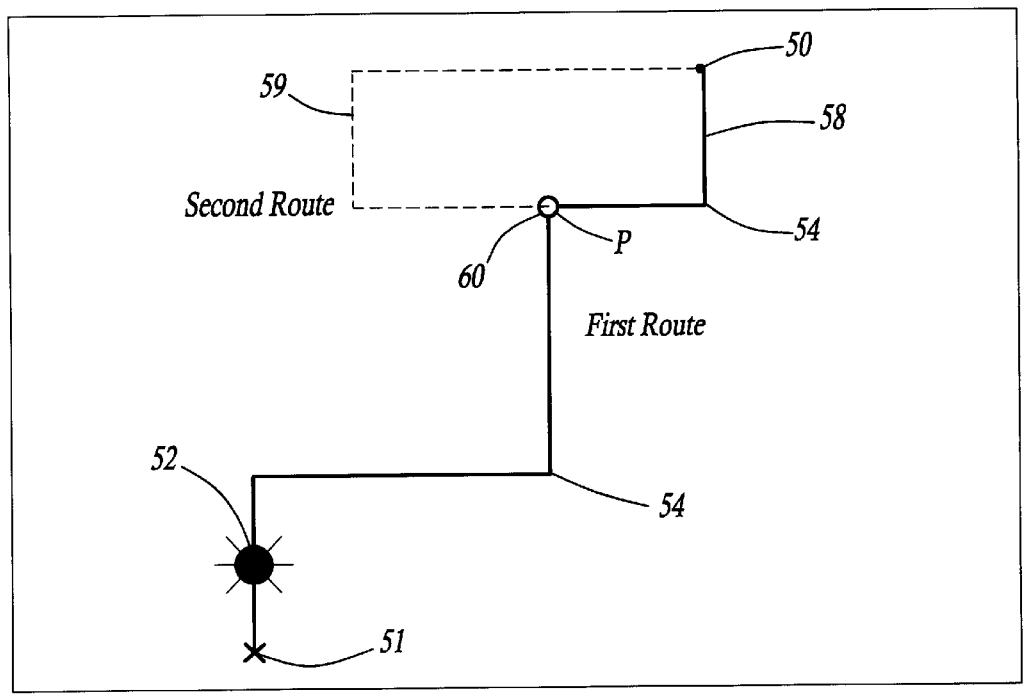
FIG. 3 is a representation of the method of determining the second route to the first destination by the navigation system of FIG. 1.

Referring to FIG. 3 the driver of the vehicle 32 preferably selects a destination 50 relative to the database 28 and inputs the destination 50 to the CPU 22 utilizing the input device 26. Usually the vehicle's current location as determined by the position determining devices is selected as a first origin 51 relative to the database 28. The CPU 22 then calculates a first route 54 from the first origin 51 to the destination 50. While travelling the first route 54, the position determining devices continuously calculate the current vehicle location 52 relative to the database 28. If while traveling the first route 54, the CPU 22 receives congestion data from the congestion data receiver 42, indicating that a road segment 58 is congested, the CPU 22 selects as a new "origin" point 60 which is a point lying along the first route 54 between the current vehicle location 52 and destination 50. The CPU 22 then calculates a second route 59 to the destination 50 which avoids road segment 58.

The distance between the current vehicle location 52 and the intermediate point 60 is preferably optimized to give the driver of the vehicle 32 sufficient time to make the initial maneuver where the driver of the vehicle 32 would deviate from the first route 54 to the second route 59. The distance depends upon the type of road being travelled, such as a highway or sidestreet, the current or expected vehicle speed, and the complexity and type of initial maneuver onto the second route 59. The CPU 22 then guides the driver of the vehicle 32 along first route 54 until reaching intermediate point 60, where CPU 22 guides the driver of the vehicle 32 along the second route 59 to the destination 50 by displaying turn-by-turn instructions on display 24.

Preferably, the CPU 22 first determines whether the second route 59 will result in a significant reduction in time from the first route 54 before recommending the second route 59. For example, the CPU 22 only recommends the second route 59 if it results in a 20 percent reduction in travel time, where the reduction is no less than five minutes. If these criteria are met, the CPU 22 beeps to get the attention of the driver while displaying a new screen offering the second, quicker route. The CPU 22 then provides the driver of the vehicle 32 with the option of selecting the second route 59. Preferably, a voice informs the driver that the first recommended route 54 contains traffic congestion and inquires whether the driver would prefer a second recommended route 59 which would result in a significant time reduction. The CPU 22 also indicates the estimated time savings for the second route 59 to assist the driver's decision. If the driver does not choose the quicker route within a certain time period, the CPU 22 will continue to guide the driver of the vehicle 32 along the first route 54. The CPU 22 preferably does not offer a route improvement to the driver more often than once every five minutes. The driver of the vehicle 32 can enable or disable the presentation of route improvements based upon traffic information.

Figure 4:
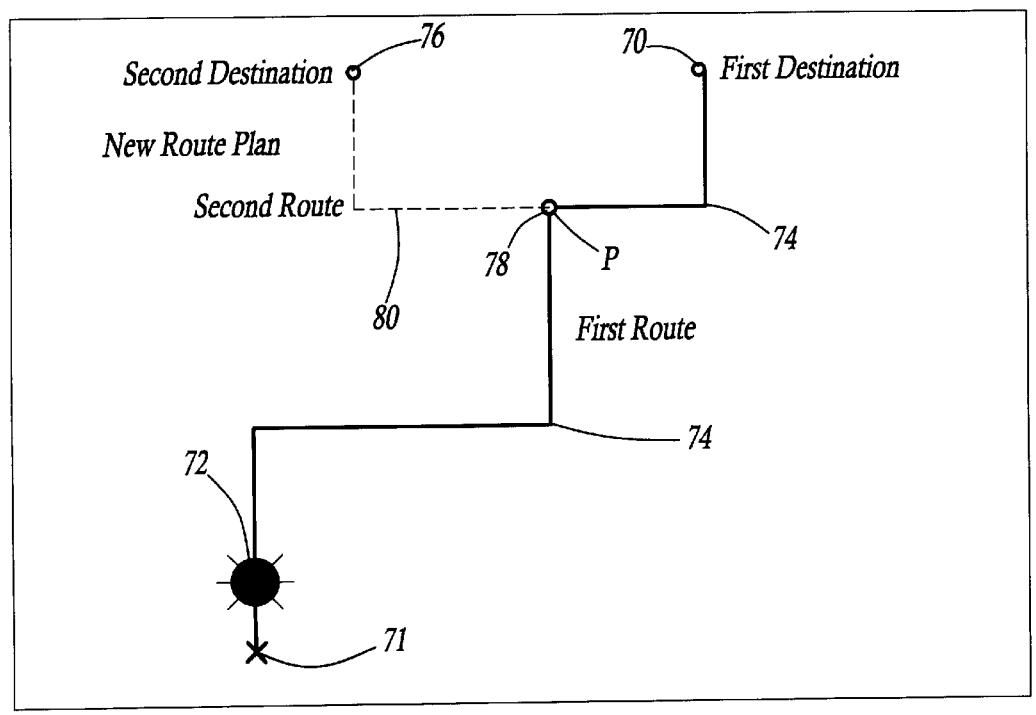
FIG. 4 is a representation of the method of determining the second route to a second destination by the navigation system of FIG. 1.

The operation of the navigation system 20 of the present invention is also demonstrated in FIG. 4. The driver of the vehicle 32 preferably selects a first destination 70 from the database 28. As described above, and as is well-known, the CPU 22 calculates a first route 74 from a first origin 71 to the first destination 70. The position determining devices continuously determine the current vehicle location 72. If, while en route to the first destination 70, the driver of the vehicle 32 decides to travel to a second destination 76 rather than the first destination 70, the CPU 22 selects an intermediate point 78 which lies along the first route 74 between the current vehicle location 72 and the first destination 70. The CPU 22 then calculates a second route 80 from the intermediate point 78 to the second destination 76. The CPU 22 guides the vehicle 32 along the first route 74 to the intermediate point 78 and from the intermediate point 78 along the second route 80 to the second destination 76.

When recommending a change in the route for any reason, the navigation system 20 of the present invention selects a second "origin", intermediate point 60, 78, between the current location 52, 72 and the first destination 70, 50. The navigation system 20 provides sufficient distance between the current location 52, 72 and the intermediate point 60, 78 such that the initial maneuver onto the second route 76, 59 will not be missed or rushed. This reduces safety concerns and reduces driver anxiety when the recommended route is changed. It should be recognized that the navigation system 20 of the present invention would be used in other situations where a second route is calculated and recommended to the driver. Two examples of such situations have been described here, i.e. providing guidance along a second route 80 to a second destination 76 or along an alternate route 59 to a first destination 50.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A navigation system comprising:
    a database of roads to be traveled by a vehicle, said database includes road segments, each said road segment having an associated travel time stored in said database;
    a system for selecting a first origin relative to said database;
    a user input device for selecting a first destination relative to said database;
    a system for determining a first route from said database from said first origin to said first destination;
    a system for determining the current location of the navigation system relative to said database; and
    a system for determining a second route from said database from a second origin on said first route between said current location and said first destination said system for determining said first route utilizing said associated travel times to determine said first route and for determining said second route utilizing said associated travel times to determine said second route, said system comparing said first route to said second route.

2. The navigation system of claim 1 further including a system for selecting a second destination from said database, said system for determining a second route calculating said second route from said second origin to said second destination.

3. The navigation system of claim 1 wherein said system for determining a second route calculates said second route from said second origin to said first destination, said first route including a road segment not included in said second route.

4. The navigation system of claim 1 further including a system for receiving congestion information, said system for determining said first route utilizing said congestion information to calculate said first route.

5. The navigation system of claim 1 wherein said database includes road segments, each said road segment having an associated travel time stored in said database, said system for determining a first route utilizing said associated travel times to determine said first route, said navigation system further including a system for adjusting for receiving congestion information about road segments, said system for determining a second route utilizing congestion information to determine said second route.

6. A method for planning a route including the steps of:
 a) selecting a first origin relative to a database of roads;
 b) selecting a first destination relative to said database of roads;
 c) determining a first route from said database of roads from said first origin to said first destination;
 d) determining a current location on said first route;
 e) determining a second route from a second origin lying on said first route between said current location and said first destination;
 f) associating an estimated travel time with each of a plurality of road segments of said roads in said database;
 g) determining said first route and said second route based at least in part upon said travel times; and
 h) comparing said first route and said second route in response to said travel times.

7. The method for planning a route according to claim 6 further including the steps of:
 providing guidance instructions from said first origin along said first route; and
 providing guidance instructions from said second origin along said second route.

8. The method for planning a route according to claim 6 wherein said step d) includes the steps of installing a position-determining device on a vehicle, said current location being the current location of the vehicle.

9. The method for planning a route according to claim 6 further including the steps of:
 associating an estimated travel time with each of a plurality of road segments of said roads in said database; and
 determining said first route and said second route based upon said travel times.

10. The method for planning a route according to claim 6 further including the steps of:
 travelling along said first route;
 selecting a second destination while travelling said first route; and
 determining said second route to said second destination.

11. The method for planning a route according to claim 6 further including the steps of:
 receiving traffic congestion information associated with a road segment; and
 determining said second route based upon said traffic congestion information.

12. A method for planning a route including the steps of:
 a) associating a travel time with each of a plurality of road segments in a database of roads;
 b) selecting a first origin relative to said database of roads;
 c) selecting a first destination relative to said database of roads;
 d) determining a first route from said database of roads from said first origin to said first destination;
 e) providing guidance instructions from said first origin along said first route;
 f) determining a current location on said first route relative to said database of roads;
 g) receiving congestion information associated with a congested road segment included in said first route;
 h) determining a second route from a second origin lying on said first route between said current location and said first destination, said second route not including said congested road segment;
 i) estimating the time to be saved by travelling said second route rather than said first route;
 j) selecting to travel said second route rather than said first route based upon said estimated time to be saved; and
 k) providing guidance instructions from said second origin along said second route.

13. A method for planning a route according to claim 12 wherein said step k) includes the step of providing guidance instructions to said first destination.

14. The navigation system of claim 1 wherein said second origin is selected on said first route at a non-zero distance from said current location.

15. The navigation system of claim 14 wherein said distance is determined based upon vehicle speed.

16. The method of claim 6 further including the step of selecting said second origin at a nonzero distance from said current location.

17. The method of claim 16 further including the step of determining said distance based upon vehicle speed.

18. The method of claim 6 further including the steps of:
 f) determining a distance from the current location; and
 g) selecting said second origin at said distance from said current location after said step f).

19. The method of claim 18 wherein said distance is determined in said step f) based upon vehicle speed.

20. The navigation system of claim 14 wherein said system for determining said second route ensures that said second origin is selected on said first route between said current location and said first destination.

21. The method of claim 16 further including the step of ensuring that said second origin is selected between said first origin and said first destination.

* * * * *